(12) United States Patent
Nudo

(10) Patent No.: US 7,311,483 B1
(45) Date of Patent: Dec. 25, 2007

(54) EDGE PROTECTOR FOR CARGO

(75) Inventor: Tim Nudo, Springfield, IL (US)

(73) Assignee: Nudo Inc., Springfield, IL (US)

( * ) Notice: Subject to any disclaimer, the term of this patent is extended or adjusted under 35 U.S.C. 154(b) by 781 days.

(21) Appl. No.: 10/778,045

(22) Filed: Feb. 17, 2004

(51) Int. Cl.
*B60P 7/08* (2006.01)

(52) U.S. Cl. .......................................... 410/41; 410/99

(58) Field of Classification Search .................. 410/34, 410/35, 41, 87, 99, 155; 206/453, 586, 523; 248/345.1
See application file for complete search history.

(56) References Cited

U.S. PATENT DOCUMENTS

| | | |
|---|---|---|
| 3,128,106 A | 4/1964 | Zinkel, Jr. |
| 3,209,706 A | 10/1965 | Broling |
| 3,408,707 A | 11/1968 | Hemphill |
| 3,412,692 A | 11/1968 | Evans |
| 3,426,996 A | 2/1969 | Broling |
| 3,483,599 A | 12/1969 | Fisher |
| 4,150,464 A | 4/1979 | Tracy |
| 4,228,824 A | 10/1980 | Evans et al. |
| 4,402,489 A | 9/1983 | Murray |
| 4,487,537 A | 12/1984 | Morse |
| 4,754,685 A | 7/1988 | Kite |
| 5,056,664 A | 10/1991 | Demers |
| 5,114,010 A | 5/1992 | Smith |
| 5,247,897 A | 9/1993 | Pepp |
| 5,382,123 A | 1/1995 | Dawson |
| 5,383,257 A | 1/1995 | Krauss |
| 5,507,076 A | 4/1996 | Anscher |
| 5,664,918 A | 9/1997 | Heider et al. |
| 5,848,865 A | 12/1998 | Beals |
| 5,933,925 A | 8/1999 | Anscher et al. |
| 5,943,963 A | 8/1999 | Beals |
| 6,227,780 B1 * | 5/2001 | Stewart et al. ................ 410/99 |

OTHER PUBLICATIONS http://www.allhands.com/snaptite.html snap-tite/ponn/national-hose-appliances-valves-LDH-water supply..pp. 1-6.
http://www.water-way.net/Product_Guide/Fire_Hose/municipal_hose1.htm Municipal Fire Hose pp. 1-2.
http//www.fibersourse.com/f-tutor/aramid.htm Aramid Fiber p. 1 of 1.
http://www.fibersourse.com/f-tutor/q-guide.htm A Quick Guide to Manufactured Fibers pp. 1-8.
http://www.allhands.com/snaptite.html snap-tite/ponn/national-hose-appliances-valves-LDH-water supply..pp. 1-6, at least Dec. 31, 2007.
http://www.water-way.net/Product_Guide/Fire_Hose/municipal_hose1.htm Municipal Fire Hose pp. 1-2, at least Dec. 31, 2000.
http//www.fibersourse.com/f-tutor/aramid.htm Aramid Fiber p. 1 of 1, at least Feb. 5, 2004.
http://www.fibersourse.com/f-tutor/q-guide.htm A Quick Guide to Manufactured Fibers pp. 1-8, at least Feb. 5, 2004.

* cited by examiner

*Primary Examiner*—Stephen Gordon

(57) ABSTRACT

An edge protector for shielding corners of cargo such as laminated panels or sheet material from damage by a tie down strap used mounted on a platform for shipment. The edge protector is preferably constructed from an aramid fiber with a polyurethane foam filler for cushioning. A plurality of buckle fasteners are sewn to the top surface of the edge protector to position the strap against movement during transportation. An abrasion resistant and cut resistant surface is provided on the edge protector for protection against the edges of the strap.

3 Claims, 3 Drawing Sheets

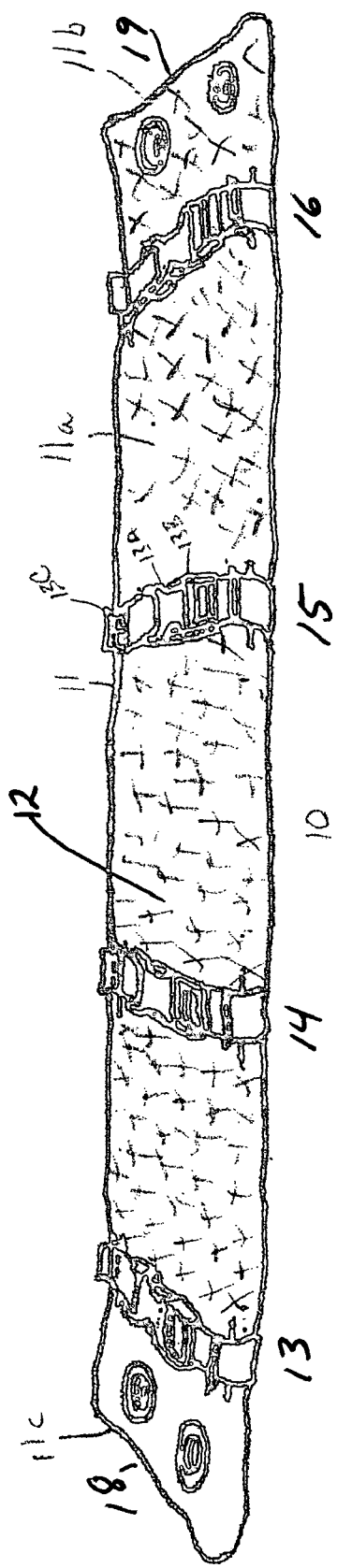
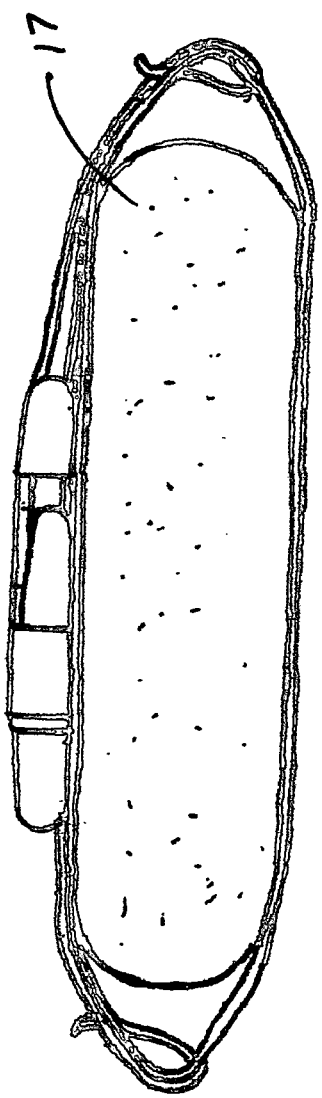
FIG. 2
FIG. 3

EDGE PROTECTOR FOR CARGO

BACKGROUND OF THE INVENTION

1. Field of the Invention

The present invention concerns generally a protective device for placement between a strap or band and the uppermost corner of a stack of cargo to protect the corner edges of the cargo from being torn by the strap.

2. Background of the Invention

In the paneling industry it is standard practice to secure stacks of paneling such as laminated panels for example by a tensioned strap. Previously used edge protectors are right angular protectors or foam cushions in place on the stack corners to isolate the top panels from contact with a strap or tensioned band extending thereabout. The problem arises when panels are placed on one another to cause the span segment of the strap extending across the stack to be displaced downwardly into contact with the uppermost panel of the stack. The problem is further complicated by the use of a clamp extending about the end segments of the band which adds to the thickness of the band and further jeopardizes the finish or surface of the uppermost panel.

Various types of edge protectors have been proposed for use on stack sheet material including molded articles such as those disclosed in U.S. Pat. Nos. 4,120,441, and 4,742,916 and 4,202,449 which discloses a protector of extruded shape. U.S. Pat. Nos. 3,443,684 and 4,292,901 disclose protectors for placement on the corners of stacked material to isolate a tension band or cord from contact therewith.

U.S. Pat. Nos. 3,209,706, 3,426,996, 4,402,489, 4,487,537, 5,114,010, 5,382,123 5,848,865 further disclose edge protectors or clamps used to protect the corners of the freight during transportation.

Another problem in the industry is that expensive panels are carefully inspected by most purchasers and more importantly the top panels having any surface irregularity are rejected resulting in a reimbursement to the customer and an expense to the seller.

Currently, most protective devices used on trucks with paneling make contact between the strap and the surface of the paneling causing a surface irregularity to depreciate sheet value. Accordingly, it is preferable to limit the contact surface area to that of the edge protector.

Accordingly, it should be apparent that there is a need for a edge protector device that does not mar the panels with which it comes in contact and that is durable, provides ample cushioning protection, is easy to attach, and is relatively inexpensive to manufacture.

SUMMARY OF THE INVENTION

The present invention is directed to an edge protector for shielding corners of laminated panels or sheet material from damage by a tie down strap used mounted on a platform for shipment. The edge protector is preferably constructed from an aramid fiber with a polyurethane foam filler for cushioning. A plurality of buckle fasteners are sewn to the top surface of the edge protector to position the strap against movement during transportation. An abrasion resistant and cut resistant surface is provided on the edge protector for protection against the edges of the strap.

It is an object of the present invention to provide a cut resistant edge protector for protecting cargo corners from clamping straps used to bind the cargo for transportation.

It is a further object of the present invention to provide an abrasion resistant edge protector for protecting cargo corners from clamping straps used to bind the cargo for transportation.

It is still a further object of the present invention to provide a cushioning edge protector for protecting cargo corners from clamping straps used to bind the cargo for transportation.

Another object of the present invention to provide an edge protector for protecting cargo corners from clamping straps used to bind the cargo for transportation and fastening the edge protector to the strap.

The present invention is directed to an article for protecting corners of sheet material stacked on a supporting bed and secured to said supporting bed by a strap which is secured into a binding position by a pair of clamps. The article includes an edge protector having a flexible body member made of mildew resistant fiber and has a top surface for supporting the strap. A plurality of fasteners attached to the top surface of the body member has a buckle for securing strap to said top surface to protect the corner of the sheet material from the strap.

BRIEF DESCRIPTION OF THE DRAWINGS

FIG. 2 is a perspective view of the edge protector in accordance with the present invention.

FIG. 3 is a cross-sectional view of FIG. 2 of the edge protector in accordance with the present invention.

DETAILED DESCRIPTION OF PREFERRED EMBODIMENTS

Embodiments of methods and apparatuses for an edge protector are disclosed. In the following description, numerous specific details are set forth in order to provide a through understanding of the present invention. It will be apparent, however, to one of ordinary skill in the art that the specific detail need not be employed to practice the invention. In other instances, well-known materials or methods have not been described in detail in order to avoid obscuring the present invention.

Reference throughout this specification to "one embodiment or an embodiment means that a particular feature, structure or characteristic described in connection with the embodiment is included in at least one embodiment of the present invention. Thus, appearances of the phrases in one embodiment or in an embodiment in various places throughout the specification are not necessarily all referring to the same embodiment. Furthermore, the particular features, structures or characteristics may be combined in any suitable manner in one or more embodiments.

Figure 1:
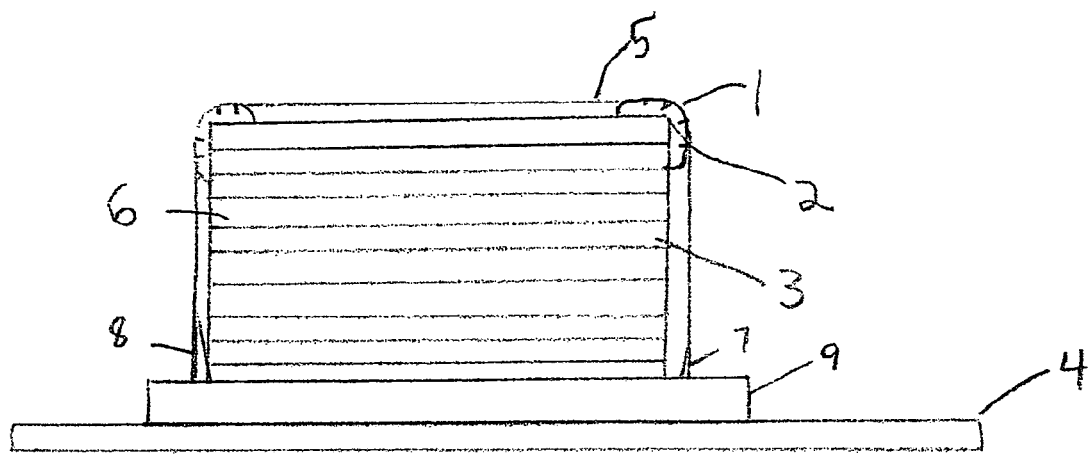
FIG. 1 is a perspective view of an edge protector secured to an edge of a stack of sheet material in accordance with the invention.
Figure 4:
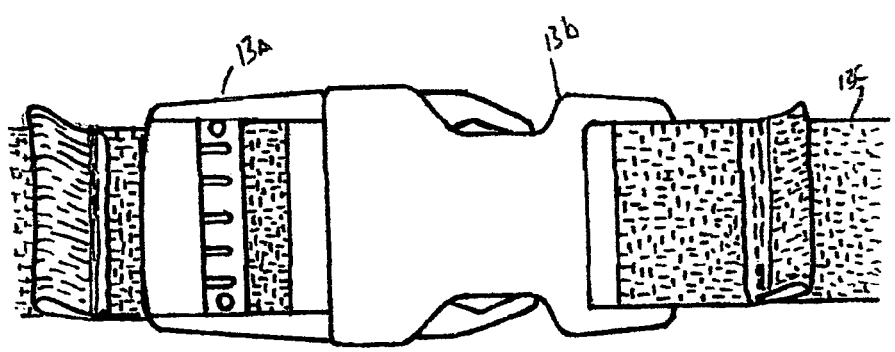
FIG. 4 is a perspective view of a fastener of the edge protector in accordance with the present invention.

FIG. 1 illustrates an article 1 for protecting corners 2 of sheet material or panels 3. The sheet material 3 is stacked on a truck bed 4. The truck bed 4 may be any type of support for sheet material such as a flatbed or a platform. In order to transport or secure sheet material, a strap 5 is typically wrapped over the sheet material and tightened over a lading 6. The straps are generally made of spring steel or NYLON.

The article 1 of the present invention is designed to support strap 5 as the strap is tightened around the corners of the sheet material and during transportation. Typically, one or more straps 5 are used to secure the lading 6. Each strap 5 is bound and tightened by a clamp assembly 7 which includes a means for tightening and locking the strap in place. The clamp assembly 8 is fixed to a platform 9.

As illustrated in FIG. 2, edge protector 10, is constructed in accordance with the present invention and includes a flexible body 11. In order to cover large corners, the flexible body 11 is approximately 2-4 feet in length and has a thickness of no more than 5 inches in order to bend around corners having an angle of 90 degrees. The flexible body 11 have a width of 3-18 inches in order to support different sized straps or chains as they are secured around a stack of panels. The flexible body 11 includes a top surface 11a, and ends 11b and 11c. The top surface 11a of the flexible body 11 provides a substantially flat area for resting the strap 5 as the strap bends around the corner 2 of the sheet material.

The edge protector 10 of the present invention further includes a wide elongated flexible center section 12 and a plurality of strap fasteners 13-16. In the preferred embodiment, each strap fastener 13-16 includes a male 13a and female connector 13b, each connector having a belt portion 13c sewn to the flexible body 11. Alternatively, each belt portion 13c could be formed by cutting a portion of the flexible body 11 to form a belt portion integrally from the flexible body 11. As shown in FIG. 3, each belt portion 13c is attached to each connector 13a, 13b by threading engagement. The fasteners are well known and are shown in U.S. Pat. Nos. 4,150,464, 5,383,257 and 5,507,076 which are hereby incorporated by reference. In an alternative embodiment the fasteners could be VELCRO straps or any type of belt buckle.

A cross sectional view of the edge protector 10 is shown in FIG. 3, which depicts a cushioning material 17 which is inserted into the flexible body 11 and sealed at ends 18 and 19. The cushioning material 17 is made of any resilient, flexible material such as foam or cotton. An important part of the invention is that the cushioning material 17 is made to flatten out yet protect the panels 3 from damage by the strap 5 during tightening by the clamps 7, 8.

The flexible body 11 is constructed from an aramid fiber. The aramid fibers used in the present invention are commercially available in yarn form under the trademarks "Fiber B", "KEVLAR", "DP-01", and "Nomex", as well as others. Aramid is the generic name for fibers made from the condensation product of isophthalic or terephthalic acid and m- or p-phenylenediamine. "Fiber B" and "KEVLAR" are generally understood to be products of the condensation of terephthalic acid and p-phenylenediamine while "Nomex" is understood to be a product of the condensation of isophthalic acid and m-phenylenediamine. Aramid is defined as "a manufactured fiber in which the fiber-forming substance is a long-chain synthetic aromatic polyamide in which at least 85% of the amide linkages are attached directly to two aromatic linkages." Further details of the fiber are shown in U.S. Pat. No. 3,393,210, incorporated herein by reference.

The flexible body 11 is cut and abrasion-resistant yet provides a soft, flexible surface for supporting the strap 5. An outside jacket of knitted cotton may be added to cover the flexible body 11 in some situations where an even softer surface is necessary. The flexible body 11 is also of heavy construction and has a weight of approximately 29.375 pounds per one hundred length. The material is mildew-resistant and is virtually indestructible. Straps used in the transportation and packaging industry often have sharp edges which cut into corner protectors of the prior art. The construction of the flexible body 11 of the present invention prohibits damage of this nature.

Figure 5:
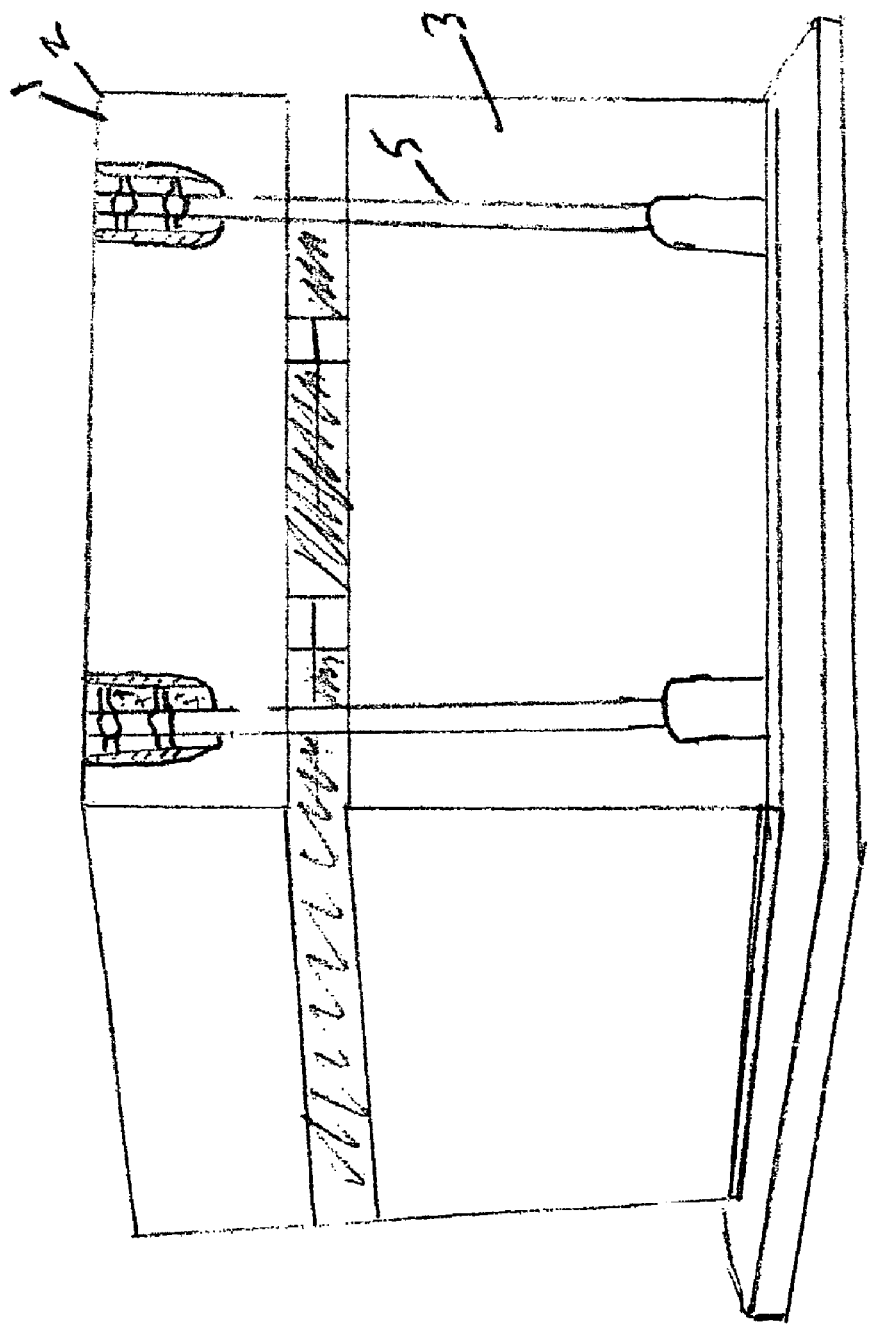
FIG. 5 is a perspective view of the edge protector secured to a lading in accordance with the present invention.

The strap fasteners 13-16 are used to secure the strap 5 to the top surface 5 of the flexible body 11. Each fastener is attached to the flexible body member by sewing or by bonding. The strap 5 may be placed onto the top surface 5 of the flexible body 11 and the fasteners 13-16 are then wrapped over the strap 5 and buckled. The strap 5 may then be tightened by each clamp 7, 8, to pull the strap around the panels and against the edge protector 10 as shown in FIG. 5. The edge protectors protect the corner 2 of the sheet material or panels 3 from the strap 5 as the strap 5 is tightened and during transportation.

In order to support the panels or sheet material stacked on a supporting platform or bed, an article 1 for protecting corners of sheet material 3 is placed in position and secured to the corners 2 by a straps 5 which are secured into a binding position by clamping assembly 7. The article 1 includes a flexible body member made of soft abrasion resistant material. The article 1 is relatively easy to construct and provides superior durability and improved performance when compared with foam cushioning devices and conventional prefabricated corner protection devices. The flexible body 11 resists fraying and helps the edge protector 10 resist deterioration from exposure to the environment and wear caused by tightening and loosening. The resistance to fraying improves the performance of the edge protector and the softness of the body material is less likely to damage the edges of the panels. These features result in a greatly improved service life when compared with other edge protectors.

I claim:

1. An article for protecting corners of sheet material stacked on a supporting bed and secured to said supporting bed by a strap which is secured into a binding position by a pair of clamps, said article comprising,
   a flexible body member, said flexible body member is approximately 2-4 feet in length and has a thickness of no more than 5 inches and is made of mildew resistant KEVLAR, said body member having a top surface for supporting said strap,
   a flexible flat cushioning material located within said flexible body member and enclosed within said body member, and a plurality of fasteners, each fastener made of VELCRO, each fastener attached to said top surface of said body member, each fastener having an attachment means for securing said strap to said top surface of said body member to protect a corner of said sheet material from said strap.

2. An article for protecting corners of sheet material stacked on a supporting bed and secured to said supporting bed by a strap which is secured into a binding position by a pair of clamps, said article comprising,
   a flexible body member, said flexible body member is approximately 2-4 feet in length and has a thickness of no more than 5 inches and is made of mildew resistant polyester, said body member having a top surface for supporting said strap,
   a flexible flat cushioning material located within said flexible body member and enclosed within said body member, and a plurality of fasteners, each of said fasteners made of VELCRO, each fastener attached to said top surface of said body member, each fastener having an attachment means for securing said strap to said top surface of said body member to protect said corners of said sheet material from said strap.

3. An article for protecting corners of sheet material stacked on a supporting bed and secured to said supporting bed by a strap which is secured into a binding position by a pair of clamps, said article comprising, a flexible body member, said flexible body member is approximately 2-4 feet in length and has a thickness of no more than 5 inches and is made of mildew resistant NYLON, said body member having a top surface for supporting said strap, a flexible flat cushioning material located within said flexible body member and enclosed within said body member, and a plurality of fasteners, each fastener made of VELCRO, each fastener attached to said top surface of said body member, each fastener having an attachment means for securing said strap to said top surface of said body member to protect said corners of said sheet material from said strap.

* * * * *